Oct. 3, 1961    D. K. SCURLOCK    3,002,241
PIPE CLAMP
Filed March 20, 1959    2 Sheets-Sheet 2
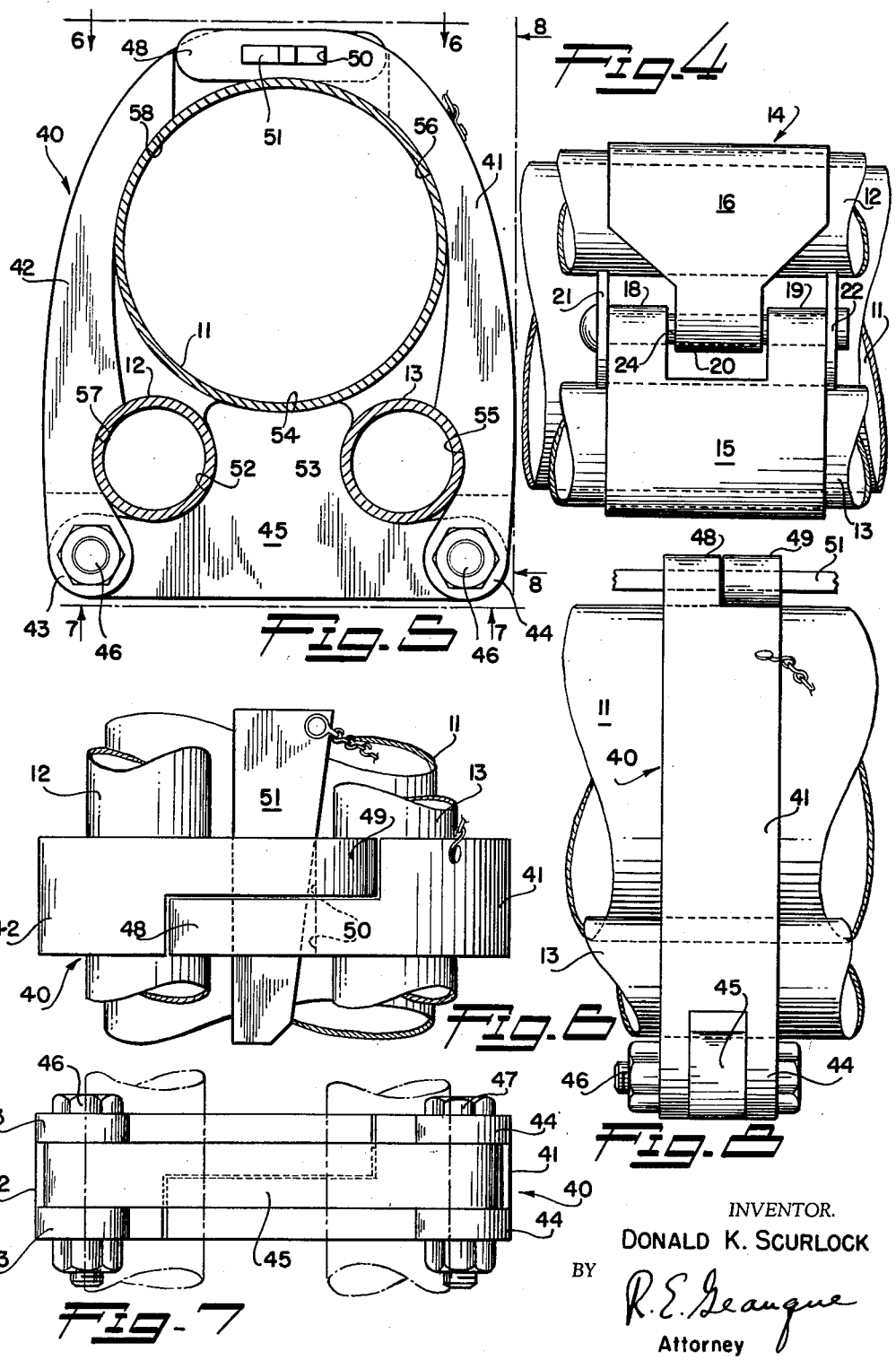
INVENTOR.
DONALD K. SCURLOCK
BY
R. E. Geauque
Attorney United States Patent Office 3,002,241
Patented Oct. 3, 1961

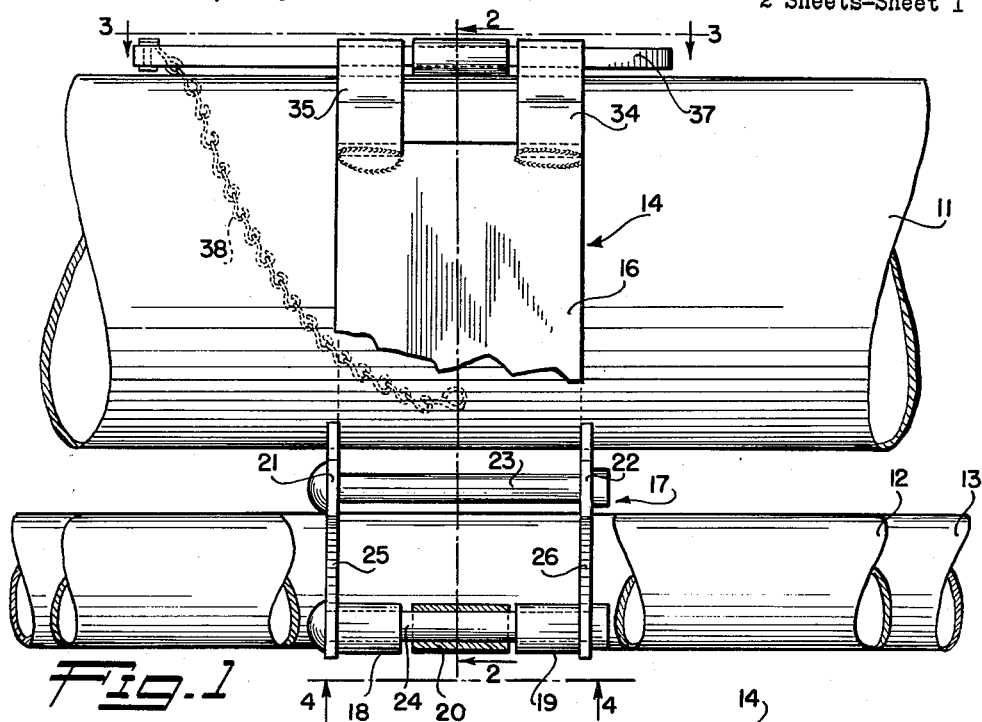

3,002,241
PIPE CLAMP
Donald K. Scurlock, Burbank, Calif., assignor to Wedgelock Corporation, North Hollywood, Calif., a corporation of California
Filed Mar. 20, 1959, Ser. No. 800,783
6 Claims. (Cl. 24—81)

This invention relates to a pipe clamp and more particularly to a pipe clamp for quickly and easily clamping a plurality of pipes together.

In the pumping of oil from a well, it is common to utilize a heater at the bottom of the well to reduce the viscosity of the fluid and thereby make the fluid easier to pump. Two pipes are connected with the heater, one carrying hot water or steam down to the heater from ground level and the other returning the cold water discharged from the heater to ground level. It is customary to attach these two pipes to the larger oil pumping pipe at various points along the oil pumping pipe to provide support for the heater pipes. The clamps for attaching the three pipes together have usually comprised two or three separate pieces which are bolted together around the pipes. This manner of attaching the pipes together is time consuming and requires the services of several persons. Also, when the three pipes are in the well, the clamps and bolts become corroded and encrusted, making it difficult and time consuming to remove the clamps and disassemble the pipes.

The present invention provides a single piece clamp which can be easily and quickly placed around the three pipes and then secured to the pipes by a locking wedge. Even though the clamps become corroded within the well, the clamps can be easily removed by simply striking the wedge with a suitable instrument. The structure of the clamp includes two arms each pivotally connected at one end with a center member and the other ends of the arms overlap when the clamp is closed in order to receive the locking wedge. In closed condition the oil pumping pipe is secured between both arms and the center member and each heater pipe is secured between one of the arms and the center member. The center member is so constructed as to space the pipes apart in order to minimize heat loss from the hot water or steam pipe to the other pipes. Thus, the clamp of the present invention can be easily placed around all three pipes and locked and the pipes will be automatically properly spaced apart within the clamp.

It is therefore an object of the present invention to provide a pipe for quickly clamping together a plurality of small pipes and which utilizes a locking wedge.

Another object of the invention is to provide a pipe clamp which comprises two arms and a center member between which three pipes are firmly held in spaced relationship.

A further object of the invention is to provide a pipe clamp for easily securing together a plurality of pipes and which can be easily removed after corrosion or contamination of the clamp.

These and other objects of the invention not specifically set forth will become readily apparent from the accompanying description and drawings, in which:

FIGURE 1 is a side elevational view partially in section showing the clamp of the present invention applied to three pipes;

FIGURE 2 is a vertical section along line 2—2 of FIGURE 1 showing the spaced relationship of the pipes;

FIGURE 3 is a top plan view along line 3—3 of FIGURE 1 showing the locking wedge;

FIGURE 4 is a bottom plan view along line 4—4 of FIGURE 1 showing the pivoted arms of the clamp;

FIGURE 5 is a side elevational view of a second form of the present invention;

FIGURE 6 is a top plan view along line 6—6 of FIGURE 5 showing the locking wedge for the clamp;

FIGURE 7 is a bottom plan view along line 7—7 of FIGURE 5; and

FIGURE 8 is a side elevational view along line 8—8 of FIGURE 5.

Referring to FIGURE 1, a large pipe 11 and two smaller pipes 12 and 13 are secured together by a clamp 14. Pipes 12 and 13 are substantially the same size and can be utilized as portions of the hot and cold pipes leading to a heater located at the bottom of an oil well while the pipe 11 is a suitable size to be utilized as a portion of the oil pumping pipe. Clamp 14 comprises two curved arms 15 and 16 and a center member 17. One end of arm 15 is formed into two spaced loops 18 and 19 while one end of arm 16 is formed into a single loop 20 located between loops 18 and 19. The center member 17 comprises two parallel plates 21 and 22 which are rigidly secured together by a pin 23 having a forced fit with openings in each plate. The ends of plates 21 and 22 are located adjacent loops 18 and 19, respectively, and contain openings in alignment with the openings of the loops. A pin 24 extends through the openings in the plates and through loops 18, 19 and 20 in order to pivotally connect the plates 21 and 22 with the ends of arms 15 and 16.

Each of the plates 21 and 22 have a first arc shaped edge 25 formed about a radius substantially the same as that for the outer circumference of pipe 12 and a second arc shaped edge 26 formed about a radius substantially the same as that for the outer circumference of pipe 13. Also, each of the plates has a third arc shaped edge 27 formed about a radius substantially the same as that for the outer circumference of pipe 11. As illustrated, the curved edges 25, 26 and 27 are spaced around the plates so that edges 25 and 26 are approximately opposite each other and edge 27 is above and approximately half way between the other two edges. The arm 15 has an arc shaped section 28 of substantially the same radius as edges 26 and arm 16 has an arc shaped section 29 of substantially the same radius as edge 25. Also, arms 15 and 16 have curved ends 30 and 31, respectively, shaped to snugly engage the outer circumference of pipe 11. The curved end 30 has a single loop 32 projecting therefrom which contains an elongated slot 33, and the end 31 has two loops 34 and 35 projecting therefrom, each of which contains an elongated slot 36. When the clamp is closed, the loop 32 is located between the loops 34 and 35 so that tapered locking wedge 37 can be inserted through slots 33 and 36 in order to pull the arms 15 and 16 tightly against the pipes. One end of wedge 37 is connected to one end of chain 38 and the other end of the chain is secured to arm 15 to prevent loss of the wedge when the clamp is open.

In assembling the clamp 14, the arms 15 and 16 are spread apart so that pipes 12 and 13 can be received at the curved sections 29 and 28, respectively, and the pipe 11 is then located within the arms and adjacent curved edge 27 of center member 17. Thereafter, the arms are brought together and the wedge 37 inserted. This causes the pipes to be pulled tightly against the curved edges of the center member, which thereafter holds the pipes in fixed, spaced relationship to one another. Since the center member 17 is pivoted to pin 24, it assumes a position such that the binding force is uniformly applied to the pipes. Also, normal variations in pipe size can be compensated since the arms 15 and 16 are pulled by the wedge tightly against the pipes. The taper and length of the wedge can be varied to vary the amount of tightening movement which can be applied to the arms, and the flexibility of arms 15 and 16 can be varied, depending on the variation in pipe sizes to be encountered by the clamp. Generally, the arms will come together enough to just permit insertion of the wedge and ths wedge is then driven into the elongated slots 33 and 36. To open the clamp, it is only necessary to drive the wedge out of the slots and therefore, any corrosion or encrustment of the parts will not interfere to any degree with the opening operation.

It is not necessary that the pipe circumferences fit perfectly against the curved edges of the center member since the center member acts primarily as an abutment to hold the pipes apart and permit tightening of the arms against the pipes. Also, it is not necessary that the pipes fit snugly against the arms 15 and 16 so long as the arms force the pipes against the center member. For example, if the arms 15 and 16 were relatively rigid, a clamping against the pipes could be obtained even though the arms did not assume the shape of the pipes at the point of engagement. As previously stated, the clamp 14 can compensate for normal variations in the size of the pipe. It is also apparent that the shape of center member 17 and the curved section of arms 15 and 16 could be varied to accommodate pipes of the same size or all of different sizes. Also, the surfaces of the clamp can be shaped to accommodate objects of various shape other than round.

A second form of the invention is illustrated in FIGURES 5-8, wherein pipes 11, 12 and 13 are secured together in spaced relationship by clamp 40. Arms 41 and 42, corresponding to arms 15 and 16 of the prior embodiment, have spaced end projections 43 and 44, respectively, which receive opposite ends of center member 45. A pivot bolt 46 passes through projection 43 and the center member while a pivot bolt 47 passes through projection 44 and the center member so that one end of each arm is pivotally connected to the center member 45. The other ends of arms 41 and 42 have reduced sections 48 and 49 which overlap when the clamp is closed and each section contains a slot 50 for receiving a locking wedge 51.

The center member 45 is rigid and has arc shaped edges 52, 53 and 54, corresponding to edges 25, 26 and 27 of member 17 of the prior embodiment. The edges 52 and 53 correspond substantially in shape to the surfaces of pipes 12 and 13, respectively, while the shape of edge 54 corresponds to the surface of pipe 11. The arm 41 has a curved surface 55 for engaging pipe 13 and has curved end surface 56 for engaging pipe 11. Also, the arm 42 has a curved surface 57 for engaging pipe 12 and has curved end surface 58 for engaging pipe 11. It is apparent that the pipes can be assembled in clamp 40 in the same manner as in clamp 14 and that the pipes will be tightly gripped when wedge 51 is driven into slots 50. Since the center member 45 and arms 41 and 42 are not connected with a common pivot pin, the clamp 40 does not have as much flexibility as clamp 14 as far as equalizing the gripping force on each pipe. However, both clamps are easy to assemble and can be reopened easily regardless of the corrosion or contamination of the parts of the clamps. Also, both clamps hold the pipes apart to minimize heat transfer between the pipes.

While the present invention is particularly suitable for clamping pipes together, it can be used to generally act as a clamp for various types and shapes of objects. Various modifications of the invention are contemplated by those skilled in the art without departing from the spirit and scope of the invention as hereinafter defined by the appended claims.

What is claimed is:

1. A clamp for clamping together a plurality of elements in fixed, spaced relationship comprising a center member, two side arms each pivotally connected at one end to said center member, a plurality of edges on the periphery of said center member each of which is adapted to engage one of said elements whereby said center member holds said elements in spaced relationship a plurality of surfaces on said arms each of which engages one of said elements, each of said arms having an opening formed in the other end thereof, and wedge means insertable through said openings in the other ends of said arms for clamping each element between one of said edges and at least one of said surfaces,, the pivotal connection of said side arms with said center member causing said center member to assume a position for receiving said elements when said side arms are spread apart and to assume a position such that the binding force is uniformly applied to said elements when said other ends of said side arms are clamped together by said wedge means.

2. A clamp for clamping together a plurality of elements in fixed, spaced relationship comprising a center member, two side arms both pivotally connected at one end to said center member, a plurality of curved edges on said center member each of which is adapted to engage one of said elements, a curved section in one of said arms cooperating with a first curved edge of said center member to retain one of said elements therebetween, a curved section in the other of said arms cooperating with a second curved edge of said center member to retain a second element therebetween, and an additional curved section in each arm both cooperating with a third curved edge of said center member to retain a third element therebetween, a loop portion at the other end of each of said arms and containing openings in partial alignment when the curved sections of said arms are brought into engagement with said elements, and a tapered locking wedge insertable into said openings for tightening said arms against said elements, the pivotal connection of said side arms with said center member causing said center member to assume a position for receiving said elements when said side arms are spread apart and to assume a position such that the binding force is uniformly applied to said elements when said other ends of said side arms are clamped together by said wedge means.

3. A clamp as defined in claim 2 having a single pivot pin supported by said center member for pivotally connecting said side arms to said center member, said center member being movable about said pivot pin during tightening of said arms by said wedge.

4. A clamp for clamping together a plurality of elements in fixed, spaced relationship comprising a center member, two side arms each pivotally connected at one end to said center member and extending in the same direction from said center member, said center member having three curved edges with two of the edges located substantially opposite each other and the third edge located above and substantially midway between the two opposed edges, a curved section in each arm adjacent the pivoted end thereof and opposite one of the two opposed edges of said center member, the other ends of the arms comprising curved sections opposite the third curved edge of said center member, loop means secured to said other ends of said arms and containing openings in partial alignment when the curved sections of said arms are brought into engagement with said elements located adjacent each curved edge of said center member, and a tapered locking wedge insertable into said openings for tightly clamping said elements between said curved edges and said curved sections,, the pivotal connection of said side arms with said center member causing said center member to assume a position for receiving said elements when said side arms are spread apart and to assume a position such that the binding force is uniformly applied to said elements when said other ends of said side arms are clamped together by said wedge means.

5. A clamp as defined in claim 4 having a single pivot pin supported by said center member for pivotally connecting said arms to said center member.

6. A clamp as defined in claim 4 wherein said center member comprises two spaced plate members rigidly secured together by a first pin, a second pin extending between said plate members for pivotally connecting said arms to said center member, said curved edges being located on said plates.

References Cited in the file of this patent

UNITED STATES PATENTS

| | | |
|---|---|---|
| 565,698 | Sparks | Aug. 11, 1896 |
| 715,222 | Werth | Dec. 2, 1902 |
| 2,621,384 | Slaughter | Dec. 16, 1952 |

FOREIGN PATENTS

| | | |
|---|---|---|
| 722,084 | Great Britain | Jan. 19, 1955 |